(12) United States Patent
Kalyanasundram

(10) Patent No.: US 9,524,229 B2
(45) Date of Patent: *Dec. 20, 2016

(54) TESTING COORDINATOR

(71) Applicant: Bank of America Corporation, Charlotte, NC (US)

(72) Inventor: Senthil N. Kalyanasundram, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,278

(22) Filed: Feb. 16, 2016

(65) Prior Publication Data

US 2016/0162397 A1  Jun. 9, 2016

Related U.S. Application Data

(63) Continuation of application No. 13/955,974, filed on Jul. 31, 2013, now Pat. No. 9,317,411.

(51) Int. Cl.
  *G06F 11/36* (2006.01)
(52) U.S. Cl.
  CPC ....... *G06F 11/3684* (2013.01); *G06F 11/3688* (2013.01); *G06F 11/3692* (2013.01)
(58) Field of Classification Search
  USPC ...................................................... 714/38.1
  See application file for complete search history.

(56) References Cited

U.S. PATENT DOCUMENTS

| | | | |
|---|---|---|---|
| 4,853,851 A | 8/1989 | Horsch | |
| 5,067,129 A | 11/1991 | Evans et al. | |
| 5,671,351 A | 9/1997 | Wild et al. | |
| 5,778,368 A | 7/1998 | Hogan et al. | |
| 6,446,075 B1 | 9/2002 | Velasco | |
| 6,557,120 B1 | 4/2003 | Nicholson et al. | |
| 7,689,538 B2 | 3/2010 | Li et al. | |
| 7,689,587 B1 | 3/2010 | Tiruveedi et al. | |
| 7,694,181 B2 | 4/2010 | Noller et al. | |

(Continued)

OTHER PUBLICATIONS

HP Quality Center Enterprise Software Data Sheet, Copyright 2007-2008, 2010-2013 Hewlett-Packard Development Company, L.P., Apr. 2013, 8 pages.

(Continued)

*Primary Examiner* — Kamini Patel
(74) *Attorney, Agent, or Firm* — Banner & Witcoff, Ltd.; Michael A. Springs

(57) ABSTRACT

A system for testing two or more applications associated with a computerized process may include a central repository, a user interface and a testing coordinator. The central repository may be used to store at least one test case each including a test data set and two or more sets of test scripts. The user interface may facilitate a selection of one or more test cases for use by the testing coordinator. The testing coordinator may be configured to test the operation of the computerized process by initiating testing of a first application by a first test tool using the test data set and a first set of scripts and initiating testing of the second application by the second test tool using the test data set and the second set of scripts from the selected test case. In some cases, the first test tool is incompatible with the second test tool.

8 Claims, 5 Drawing Sheets

(56) References Cited

U.S. PATENT DOCUMENTS

| | | | |
|---|---|---|---|
| 7,797,534 B2 | 9/2010 | Rits | |
| 7,886,284 B2 * | 2/2011 | Haven | G06F 8/20 717/108 |
| 7,925,665 B2 | 4/2011 | Schneider et al. | |
| 8,020,044 B2 | 9/2011 | Martinov | |
| 8,091,081 B2 * | 1/2012 | Thorson | G06F 8/68 717/116 |
| 8,091,094 B2 * | 1/2012 | Bohle | G06F 9/4443 719/320 |
| 8,239,835 B2 * | 8/2012 | Rex | G06F 11/3684 717/127 |
| 8,301,935 B2 | 10/2012 | Martinov | |
| 8,443,002 B2 | 5/2013 | Chandrasekar et al. | |
| 9,075,920 B1 | 7/2015 | Kushnirskiy | |
| 9,317,411 B2 * | 4/2016 | Kalyanasundram | G06F 11/3688 |
| 2002/0162053 A1 | 10/2002 | Os | |
| 2004/0216140 A1 * | 10/2004 | Hiltgen | G06F 9/541 719/320 |
| 2004/0243381 A1 | 12/2004 | Kuturianu et al. | |
| 2005/0235263 A1 * | 10/2005 | Bundy | G06F 11/263 717/124 |
| 2006/0156287 A1 * | 7/2006 | Vikram | G06F 11/3684 717/124 |
| 2006/0236083 A1 | 10/2006 | Fritsch et al. | |
| 2007/0220341 A1 | 9/2007 | Apostoloiu et al. | |
| 2008/0155334 A1 | 6/2008 | Mills et al. | |
| 2008/0229149 A1 | 9/2008 | Penton | |
| 2008/0244523 A1 * | 10/2008 | Kelso | G06F 11/3664 717/124 |
| 2008/0256389 A1 | 10/2008 | Neethiraj et al. | |
| 2009/0187823 A1 | 7/2009 | Farrell et al. | |
| 2009/0307531 A1 | 12/2009 | Karthikeyan et al. | |
| 2012/0030513 A1 | 2/2012 | Peng et al. | |
| 2012/0072159 A1 | 3/2012 | Wang | |
| 2013/0041900 A1 | 2/2013 | McCoy et al. | |
| 2013/0305097 A1 | 11/2013 | Arcese et al. | |
| 2013/0318402 A1 | 11/2013 | Rapp et al. | |
| 2015/0039941 A1 * | 2/2015 | Kalyanasundram | G06F 11/3688 714/38.1 |
| 2015/0082322 A1 * | 3/2015 | Stribling | G06F 9/541 719/313 |
| 2016/0162397 A1 * | 6/2016 | Kalyanasundram | G06F 11/3692 714/38.14 |

OTHER PUBLICATIONS

IBM Rational Functional Tester, Copyright IBM Corporation 2008, Jan. 2008, 4 pages.

* cited by examiner

TESTING COORDINATOR

CROSS-REFERENCE TO RELATED APPLICATIONS

This application is a continuation of U.S. application Ser. No. 13/955,974 filed on Jul. 31, 2013, the entire contents of which are herein incorporated by reference.

BACKGROUND

Currently, automated tests are chosen from a list of files and launched by a human operator independently for each application associated with a multi-step process. These tests have to be supervised so when one test is finished, another one may be launched by the operator. However, in many cases, these applications are developed by different groups of developers that may be located at two or more different geographical locations. Further complicating testing of the multi-step process, each of the group of developers may use a different set of development and/or test tools while developing the individual applications. As a result, the testing results of each application have to be collected and analyzed by the operator in order to decide if a finished test needs to be re-run and/or whether the next application used for the process can be tested.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an illustrative example, a system for testing two or more applications associated with a computerized process may include a central repository configured to store one or more test cases. Test cases may include a test data set that may correspond to a desired operation of the computerized process. In some cases, the test case may include one or more sets of test scripts. For example, a first set of test scripts may be associated with a first test tool used to test a first application associated with the computerized process and a second set of test scripts associated with a second test tool used to test a second application associated with the process. In some cases, the illustrative system may include a user interface to facilitate a selection of one or more test cases from the central repository. The illustrative system may include a testing coordinator in communication with the repository and the user interface. The testing coordinator may be used to test the operation of the computerized process by coordinating the testing of individual applications corresponding to at least a portion of the computerized process. For example, the user interface may communicate information (e.g., a test data set, a first set of scripts, a second set of scripts, a combination of the aforementioned, and/or the like) about a selected test case stored in the central repository to the testing coordinator. The testing coordinator may initiate a test of the first application by the first test tool using the test data set and the first set test scripts from the selected test case. The testing coordinator may then initiate a test of the second application by the second test tool using the test data set and the second set of scripts from the selected test case.

In some cases, an illustrative testing coordinator may be used to coordinate testing of two or more different applications associated with a multi-step process, wherein a first application may be associated with a first portion of the process and a second application may be associated with a second portion of the process. In some cases, the first application is configured to be tested with a first test tool and the second application is configured to be tested using a second test tool. The first test tool may be incompatible with the second test tool. For example, the first test tool and the second test tool may be sourced from different vendors and/or may be configured to process test scripts written in different computer languages (e.g., C, C++, Java script, Java, Python, Ruby, Perl, VB script, Jscript, and the like).

In some cases, the illustrative testing coordinator may include a communication interface, a processor and/or a non-transitory memory. In some cases, the testing coordinator may include a user interface that may be included in a same housing as the testing coordinator, or may be located external to the testing coordinator. The communication interface may be used to facilitate communication between the testing coordinator and one or more test tools (e.g., the first test tool, the second test tool, and the like) and/or a central repository. The communication interface may be configured to communicate via a wired and/o a wireless network. In some cases, the central repository may be configured to store at least one test case that may include a test data set, a first set of scripts for use with the first test tool and/or a second set of scripts for use with the second test tool. The processor may be configured to process instructions stored in the memory that, when executed, cause the processor to identify a test case stored in the central repository, initiate, via the network, testing of the first application by the first test tool using the test data set and the first set of scripts, initiate, via the network upon completion of testing of the first application, testing of the second application using the test data set and the second set of scripts. In some cases, the testing coordinator may be configured to provide an indication of whether the test of the multi-step process completed successfully using results obtained from first test tool and the second test tool.

An illustrative method for testing a multi-step computerized process, wherein a first portion of the multi-step process is performed, at least in part, by a first application and a second subsequent portion of the multi-step process is performed, at least in part, by a second application, may include storing one or more test cases in a central repository, wherein each test case corresponds to a desired operation of the multi-step process and includes a test data set and two or more sets of test scripts, selecting a desired test case via a user interface screen, initiating a test of the first application at a first geographical location by a first test tool using the test data set and a first set of test scripts, storing an updated test data set in the central repository when the test of the first application completes, and initiating a test of the second application at a second different geographical location by a second test tool using the updated test data set and a second set of scripts.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
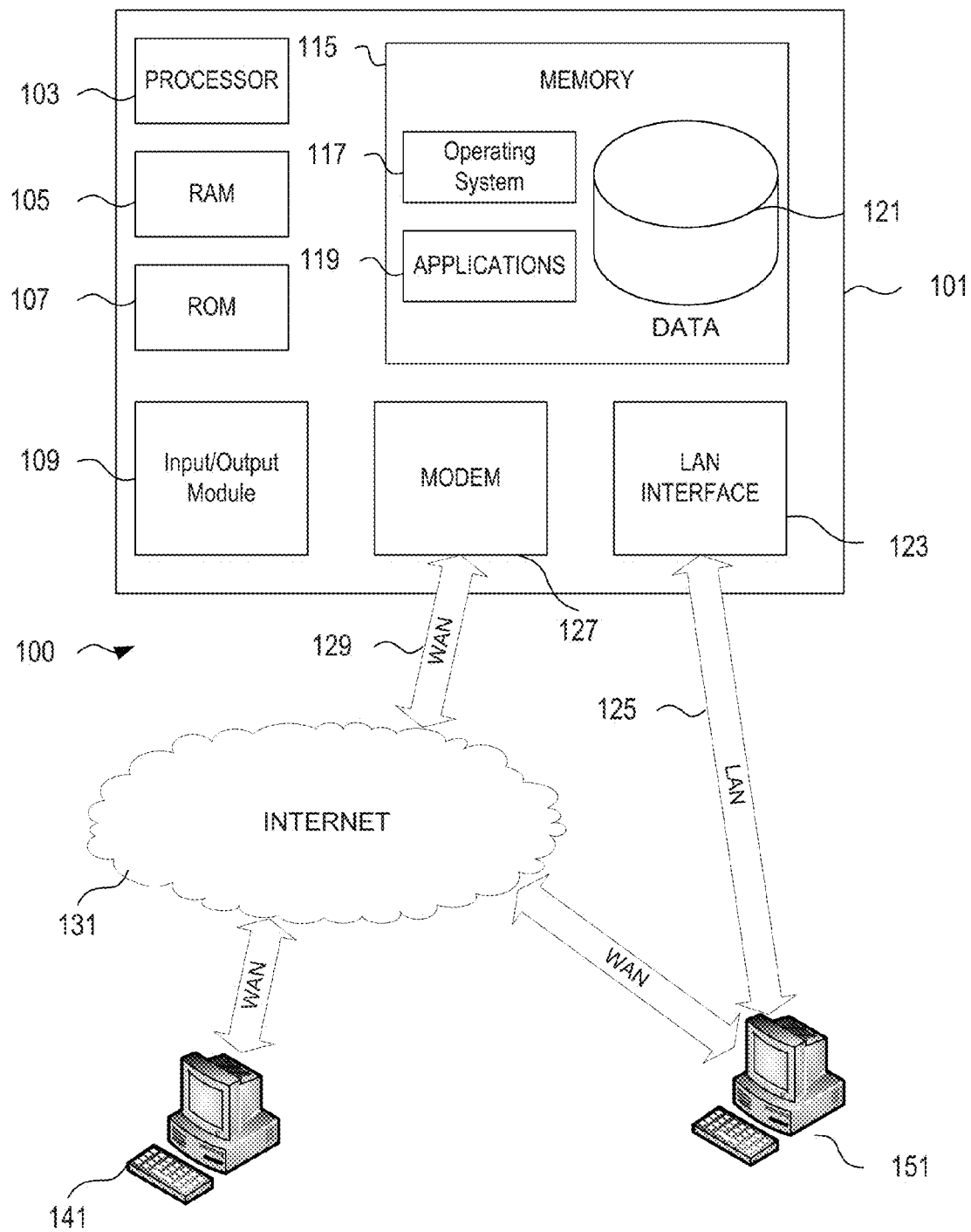
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
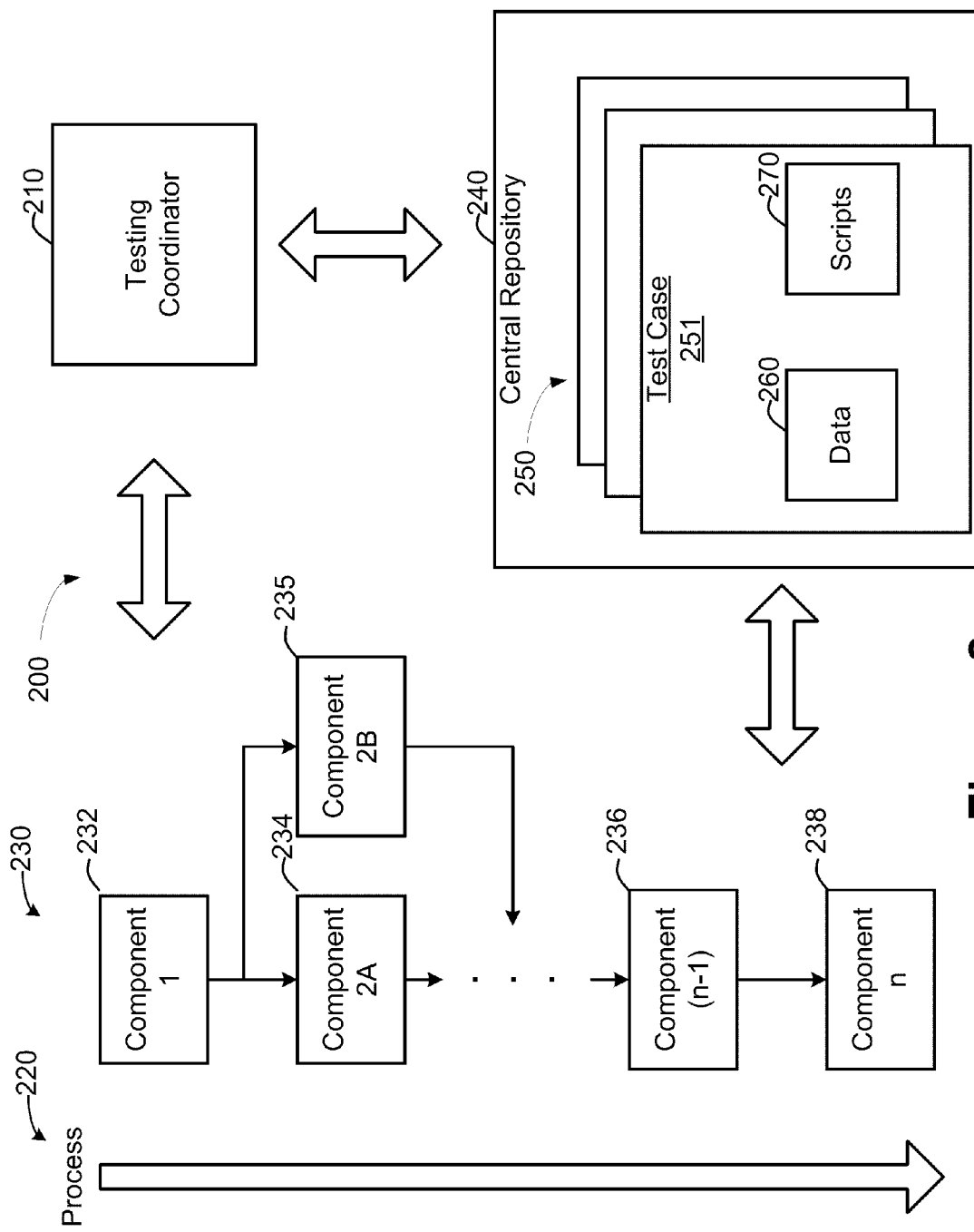
FIG. 2 is an illustrative block diagram of a system for coordinating testing of two or more applications used to perform a multi-step process according to one or more aspects of the present disclosure.

FIG. 2 is an illustrative block diagram of a system 200 for coordinating testing of two or more applications 230 used to perform a multi-step process 220 according to one or more aspects of the present disclosure. The system 200 may include a testing coordinator 210 configured for testing one or more processes, such as the multi-step process 220. The process 220 may be performed using one or more component applications 230 (e.g., a program, a service, and the like). Each of the component applications 232-238 may be performed at one or more different locations by a computer device, such as the illustrative computer device 101 of FIG. 1. The testing coordinator 210 may be communicatively coupled to a central repository 240 that may be used to store one or more test cases 250. In some cases, the test cases 250 may include, or may include references to, test data 260 and/or test scripts 270 used for testing the multi-step process 220.

With globalization, many institutions (e.g., corporations, governmental institutions, and the like) conduct business transactions between multiple locations on a daily basis. In doing so, these transactions often information to be transferred safely and securely between different these locations. Often, the transactions may be performed using distributed computing environments where tasks performed by different remote processing devices are linked through one or more communication networks. In such a distributed computing environment, a business transaction (e.g., a financial transaction) may be performed using the multi-step process 220 by using two or more component applications 230, where each component application 232-238 may be associated with a different portion of the multi-step process.

In some cases, the component applications 230 may be developed by a team of developers located at a single site. Often, however, complex software development projects may be developed using teams of developers located at multiple geographical locations. For example, a project to implement the multi-step process 220 may be developed using a distributed development model where the component applications 230 are developed at different business worksites (e.g., at different geographical locations). In such cases, the first component application 232 may be developed by a development team at a first geographical location (e.g., the United States), the second component application 234 may be developed at a second geographical location (e.g., India), and a third component application 236 may be developed at a third geographical location (e.g., Mexico). Sometimes, these different development teams may be members of the same organization having a common software development methodology. However, in many cases, development teams may be members of different organizations. As such, each development team may develop individual component applications 230 using different development tools, different test tools and/or different methodologies, thus making coordinated testing of the complete multi-step process difficult and/or inefficient. For example, a first development team may choose a test tool designed for functional and/or regression testing provided by a first multi-national vendor and a second development team may choose a different test tool designed for quality lifecycle management provided by a second multi-national vendor.

In some cases, a testing tool for a component application (e.g., the testing tool associated with the first component application 232) may be modified to coordinate execution of the remaining component applications 234-238 of the multi-step process 220 and/or for reporting the results of the process test. However, this solution may be impractical. Different multi-step processes may use the same or similar component applications 230, but may have different workflows specifying different combinations of the component applications 230. In such cases, the first component application 232 of the process 220 may not necessarily be the first component application of every process. As a result, each individual testing tool associated with the different component applications 230 would need to be modified to coordinate the testing the all possible different processes. Further, these testing tools may need to be modified for reporting the results from each test of the component applications 230. This level of customization for the different test tools would make adding component applications to a process workflow and/or removing component applications from the process workflow difficult and/or time consuming.

The testing coordinator 210, on the other hand, may be used to easily and efficiently coordinate the testing of one or more different multi-step processes 220. For example, the testing coordinator 210 may be configured as a "framework" to initiate testing of the individual component applications using the existing test tools used by the different component development groups based on a workflow corresponding to the process 220. The testing coordinator 210 may also be configured to provide test data 260 and/or test scripts 270 to the individual test tools associated with the component applications and/or for generating a report consolidating the test results associated with the component application tests.

For example, the testing coordinator 210 may load and/or process a test case 251 from the central repository 240. The testing coordinator 210 may process the test case 251 to identify information about the workflow of the process 220, test data 260 and/or test scripts 270 to be used for testing the process 220 by the test tools associated with each of the component applications 230. The workflow of the test case 251 may define a primarily serial process 220 where each of the component applications 230 is initiated after the completion of a previous component application. As shown in FIG. 2, process flow starts with the initiation of the first component application 232, the second component application 234 is initiated after the first component application 232 completes, until the process flow ends after the $n^{th}$ component application completes. In some cases, one or more component applications 235 may be initiated and/or tested in parallel with one or more other component applications 234.

As discussed above, the multi-step process 230 may have a complex workflow that may be tested using two or more different test cases. For example, an illustrative multi-step process may be associated with Automated Clearing House (ACH) transaction processing. The ACH transaction may include electronic funds transfer between bank accounts using the Federal Reserve banking system. In some cases, one or more different test cases may be associated with a particular ACH transaction, including a business to business transaction, a consumer payment transaction (e.g., payment of consumer bills including a utility payment, a loan payment, and the like), a direct-deposit payroll transaction, a tax payment transaction, and/or other e-commerce transactions. For example, a first test case may be associated with a consumer payment transaction for simulating a payment from a consumer's bank account and a vendor's bank account. A second test case may be associated with a direct deposit payroll transaction, to simulate a payroll deposit from an employer bank account to an employee's bank account.

In some cases, processing of the different ACH transactions may involve using one or more different combinations of applications. In such cases, each test case may be separated into different segments, where each segment may be associated with a particular component application. In some cases, a component application may be common to different test cases. For example, a window process application (e.g., gathering user information, providing user information, and/or the like) may be used in one or more different test cases.

Typically, each component application is tested individually. However, any test of the complete multi-step process 220 (e.g., an ACH transaction process) would involve manually triggering tests of each component application and/or manually reviewing results obtained from each component application tests based on a particular desired workflow. As such, testing of a complete ACH transaction process may be time consuming and/or error prone because of the required manual intervention. By automating testing of the ACH transaction process using the testing coordinator 210 to process the two or more different test cases, testing time may be reduced, errors resulting from manual intervention may be avoided and allocation of testing resources may be improved. For example, when an abnormal end of a particular component application occurs, a technical team may be notified to respond to the failure. In some cases, the testing coordinator may be able to determine when and/or how a particular application is to be tested based on an available pool of machines and/or a workflow associated with a particular test case. For example, testing of web-based component applications may be tested while a mainframe (e.g., server-based) application is being tested to better utilize testing resources (e.g., test machines).

For example, the ACH transaction process may be used for processing one or more transactions between parties (e.g., individuals, companies, government entities, and the like). Transactions may include a single transaction between two parties, or multiple transactions between two or more different parties. Multiple transactions may be sent and/or received as a "bulk batch" for processing. In some cases, the ACH transaction process may begin with the preparation of one or more transaction files, which may include information about one or more desired transactions, such as a transaction date, a source account number, a destination account number, a debit amount, a credit amount, and the like. When an actual ACH transaction process is initiated, the transaction files may be automatically generated, often in real-time. These transaction files may then be submitted to a different financial institution for processing. An indication of success or failure of the transaction may then be provided by the second financial institution after processing the transaction. However, during testing, the initiation of the ACH transaction process needs to be simulated. Sometimes, for example, one or more transaction files are manually generated to include appropriate transaction information. Often, errors may be introduced into the testing process when these files are manually created, such as by including an erroneous date, an erroneous account number, or the like. However, subsequent portions of the ACH transaction process rely on data provided by any of the previously executed portions of the ACH transaction. For example, the first component application 232 may provide data to the second component application 234 which, in turn, may provide data to the third component application 236, and so on. In such cases, the ACH transaction process and/or a component application may not complete as expected due to errors received from any previously run component application. By automating the testing of the ACH transaction process using the testing coordinator 210, these errors may be eliminated.

In a typical ACH transaction process, (e.g., the multi-step process 220), one or more transaction files may be created by the first component application 232. For example, a user may be prompted to enter information about a desired transaction via an interface, such as a web interface. Once created, the transaction files may be submitted for processing (e.g., by an application running on a job control language (JCL) mainframe) at a different financial institution by the second component application 234. To verify that the transaction was processed, the third component application 236 (e.g., a web application) may be configured to receive information about the success or failure of the transaction processing at the different financial institution. In such cases, the third component application 236 may be allowed to execute when one of the previous component applications 232, 234 fail.

To test the ACH transaction process, the testing coordinator 210 may be configured to coordinate the operation of the component applications 232, 234, 236, as discussed above. For example, the testing coordinator 210 may be configured to process shell scripts and/or file system objects provided by one or more test tools associated with the component applications 232, 234, 236. To begin testing the ACH transaction process, the testing coordinator 210 may provide test data 260 and/or test scripts 270 associated with a test case 251 for testing the ACH transaction process. For example, test tools associated with the first component application 232 may process at least a portion of the test data 260 using a portion of the test scripts 270 to cause the first component application 232 to generate a transaction file based on the data. The testing coordinator 210 may monitor the testing of the first component application 232 for an indication of success or failure of the component application test. For example, the test tools may provide an indication whether the transaction file is in a proper format and/or contains the same data. In some cases, the testing coordinator 210 may determine whether the format and/or content of the transaction files are correct. Further, the first component application 232, the test tools, and/or the testing coordinator 210 may update the test data 260 for use by the second component application 234.

The testing coordinator 210 may initiate a test the second component application 234 by the test tools associated with the second component application 234 and using the updated test data set 260 and at least a portion of the test scripts 270. For example, the second component application 234 may process the transaction files into a format required by a particular financial institution, as may be defined in the test case and/or may process information representative that the transaction files were received at the financial institution. The test tools and/or the testing coordinator 210 may determine whether the second component application completed successfully. For example, the testing coordinator 210 may monitor the testing of the second component application 234 for an indication of success or failure of the component application test. Upon completion of the test, the second component application 234, the test tools, and/or the testing coordinator 210 may update the test data 260 for use by the third component application 236.

In some cases, output from the second component applications 234 may be supplemented by information provided by another fourth component application 235. For example, the fourth component application 235 may operate in parallel with the second component application. For example, the fourth component application may be configured to set authorization and/or blocks to a particular account. These authorizations and/or blocks may enable an account to transfer more than a specified value (e.g., an upper transfer limit) or limit a particular transfer to a specified value (e.g., set a transfer limit). The testing coordinator 210 may initiate the test of the fourth component application 235 concurrently to the initiation of test of the second component application 234 or during the test of the second component application 234. The test tools and/or the testing coordinator 210 may determine whether the fourth component application completed successfully. For example, the testing coordinator 210 may monitor the testing of the fourth component application 235 for an indication of success or failure of the component application test. Upon completion of the tests of the second component application 234 and the fourth component application 235, the fourth component application 234, the test tools, and/or the testing coordinator 210 may update the test data 260 for use by the third component application 236.

The testing coordinator 210 may initiate a test of the third component application 236 by the test tools associated with the third component application 236 using the updated test data set 260 and at least a portion of the test scripts 270. The third component application 236 may be tested to simulate receiving communications from the second financial institution about the success and/or failure of the transaction. The testing coordinator 210 may monitor the testing of the third component application 236 for an indication of success or failure of the component application test.

In some cases, the testing coordinator 210 may determine the dependencies, if any, between the different component applications 232, 234, and 236 based on the output of the preceding component applications 232, 234. For example, the second component application may use different test data 260 and/or test scripts 270 based on the output of the first component application 232 and/or the third component application 236 may use different test data 260 and/or test scripts 270 based on the output of the second component application 234. In some cases, the testing coordinator 210 may determine an efficient use of available testing resources based on the operation of the test tools associated with the component applications 230, any dependencies between the different component applications 230 and/or an amount of resources (e.g., computers, servers, and the like) available to process the desired tests.

Another multi-step process 220 may correspond to a global billing system "mass pay" transaction, where multiple systems may be involved, including a third-party vendor system for processing a payment, for example, to one or more corporate accounts. For example, in a particular mass-pay transaction, up to twenty different systems may be involved at some time during the transaction. A global billing system mass-pay transaction may include one or more different ACH transactions as part of the complete mass-pay process. The multiple systems may include one or more of an Office of Foreign Assets Control (OFAC) system, a foreign currency conversion system, a sanctions system, and the like), one or more middleware components (e.g., a message request processor, a file request processor, a global payment system, and the like), downstream systems (e.g., a billing system, an anti-money laundering system, a reporting system, an activity monitoring system, and the like) and/or the like.

When testing the complete global billing system mass-pay process, each component of the system must be tested, individually and as part of the complete multi-step process 220. Each component application may be developed and/or tested by different testing teams, which may be located at different geographical locations (e.g., the United States, India, Germany, Mexico, the United Kingdom, and the like). Accordingly, each of the different testing teams may use different frameworks and/or test tools to support a rapid and robust testing solution for each of the component applications 230. To integrate all the different necessary component applications 230 used to perform the multi-step process 220, the testing coordinator 210 may be configured to process one or more test cases 250 that define the operation and/or processing order of the different component applications 230. If each of the component applications 230 of the global billing system mass-pay process was tested manually, each testing group would need to communicate (e.g. within a single conference call, at a meeting at a central location and the like) to determine the workflow for the multi-step process 220 and/or the testing protocol for the complete process 220. Such a workflow would require different test groups to wait for other component applications to complete testing before performing their component testing. When a component application 232-238 fails a test, the subsequent test groups would remain in a wait mode until the previously failed component is retested.

The testing coordinator will not only individually test each of the component applications 230, but also test the operation of the entire multi-step process 220 without manual intervention, or with minimal manual intervention, thereby accelerating the testing timeline and reducing the project cost for testing the operation of the multi-step process 220. The testing coordinator 210 may be configured to test one or more different multi-step processes 220 and may reuse test cases, test data and/or test scripts developed for testing a particular component application individual and/or for testing at least a portion of a different process. For example, because a global billing system mass-pay process may include one or more ACH transactions, the test cases, the test data, and/o the test scripts developed for testing different ACH transactions may be reused when testing the global billing system mass-pay process. The testing coordinator 210 may process the test cases 250 to execute the component applications 230 using the test data 260 and the test scripts 270 and store the results of the tests into a storage device, such as the central repository 240. The testing coordinator 210 may logically decide the test order of the component applications 230 and/or when to initiate testing of each of the component applications 230 based on a particular test case 251 and/or results obtained from previously tested component applications 230. For example, the testing coordinator 210 may receive results from a test of the first component application 232 and may process the results to determine whether to perform tests on one or more of the subsequent component applications 234, 235, 236, 238.

After processing the test case 251, the testing coordinator 210 may initiate the testing of the process 220 by individually initiating a test of the component applications 230 by their associated test tools. While the component application tests are performed, the testing coordinator may be configured to monitor the operation of the tests. For example, testing coordinator may monitor the tests of the component application tests for errors, either by monitoring an error output by a test tool or by comparing monitoring the output by the component applications during the tests. For example, the testing coordinator 210 may be configured to compare the output of a component application 232, 234, 235, 236, 238 to a result data set to determine whether the component application is operating as expected. In some cases, the testing coordinator 210 may be configured to analyze (e.g., compare the output of the last component application 238 to a result data set) to determine whether the process 220 completed successfully.

The testing coordinator may be configured to have one or more error reactions for testing the multi-step process 230. For example, the testing coordinator 210 may be configured to end a test of the multi-step process 220 when an error occurs during a test of the one or more component applications 230. In other cases, the testing coordinator 210 may pause the execution of the process test when a component application 232-238 experiences a fault during a test, such as an abnormal end (e.g., a "crash", testing environment unavailability, and the like). In such cases, the testing coordinator 210 may prompt a user to continue the process test or to end the process test. In other cases, the testing coordinator 210 may be configured to continue the process test when an error occurs during one or more of the component application tests. For example, the test coordinator 210 may output an indication (e.g., an email, a log entry, a text message, a pop-up window on a display, and the like) of an error that occurred during the test of a particular component application and continue testing the multi-step process 230. Upon completion of the test of the multi-step process 220, the testing coordinator 210 may be configured to report the results of the process test. For example, the testing coordinator 210 may consolidate results received from the individual component test tools into a single test report, such as in a file (e.g., text document, a spreadsheet, and the like), an email, a text message, a screen displayed on a user interface, or the like.

Figure 3:
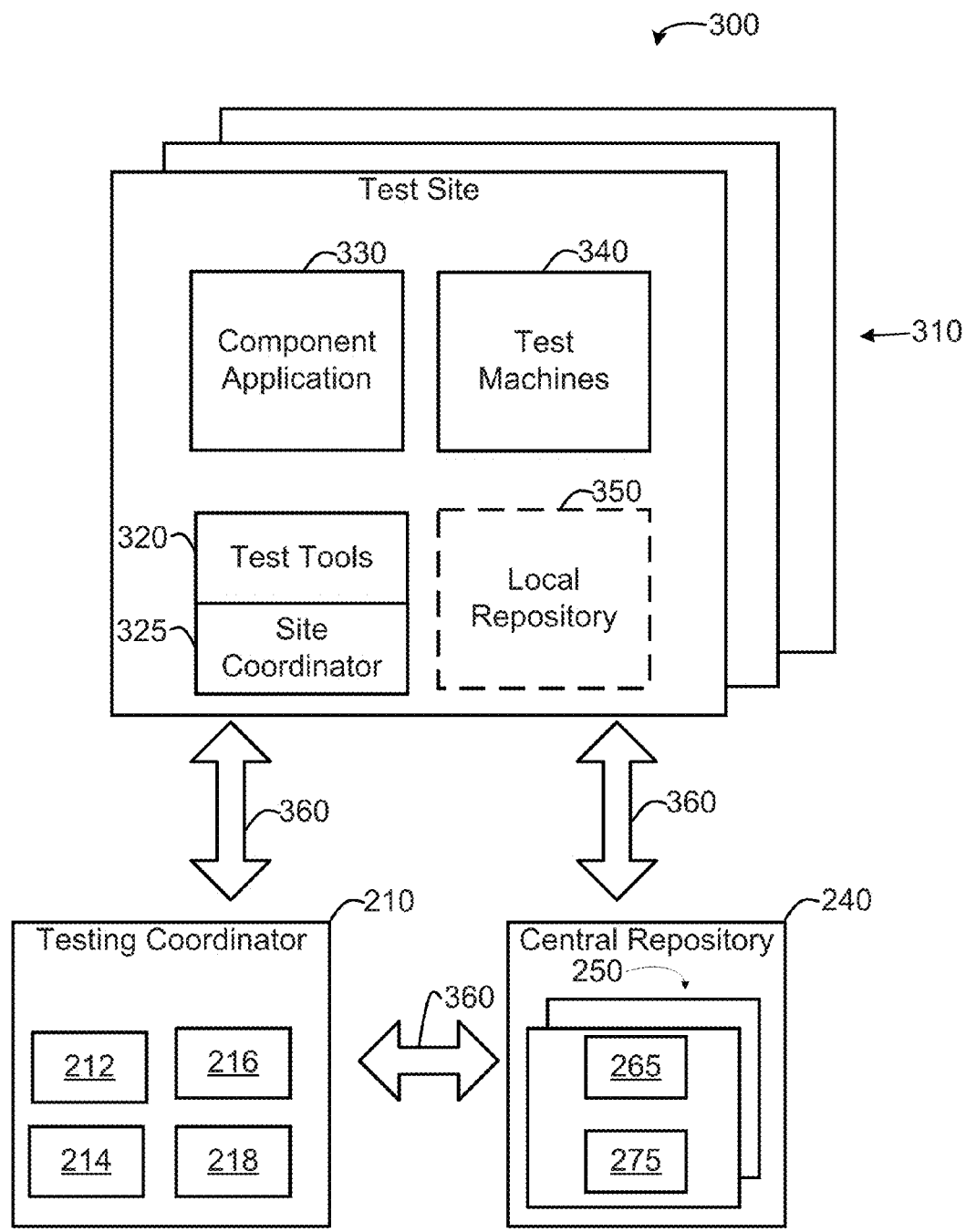
FIG. 3 is an illustrative block diagram of a system for coordinating testing of two or more applications used to perform the multi-step process of FIG. 2 according to one or more aspects of the present disclosure.

FIG. 3 is an illustrative block diagram of a system 300 for coordinating testing of two or more component applications 230 used to perform the multi-step process 200 of FIG. 2. The illustrative system 300 may include the testing coordinator 210 and the central repository 240. As mentioned above, the applications 230 may be developed, tested, and/or performed at one or more different geographical locations. In such cases, the system 300 may include one or more test sites 310 where automated tests may be performed on the one or more of the component applications 230, such as a component application 330. Each of the test sites 310 may include one or more test tools 320 used for testing the component application 330. The test tools 320 may be configured to process one or more sets of test scripts 275 using a test data set 265 while when performing a test of the application 330. Further, the test tools 320 may be configured to receive a set of test scripts 275 and/or the test data set 265 from the central repository 240. In some cases, the test site 310 may include a local repository 350 that may include one or more sets of test scripts and/or test data sets for use when testing the application 330. Each of the test sites 310 may be communicatively coupled via a wired or wireless network 360 to the testing coordinator and/or the central repository 240. The central repository 240 may include one or more test cases 250. Each of the test cases 250 may include a test data set 265 and/or one or more sets of test scripts 275.

In some cases, the component application 330 may be developed to perform a particular task to be used with particular multi-step process 220. In some cases, the multi-step process may be used for transferring information (e.g., transferring financial information, performing a financial transaction, and the like) from a computer device at a first geographical location to a computer device at a second geographical location. In some cases, any number of component applications 232-238 and 330 may be re-used when performing different multi-step processes. Component applications may include functionality to facilitate entry of financial information, transfer of money from a first financial account to a second financial account, performance of user identity validation, entry of comments, and the like. In other cases, the component applications may provide error reaction functionality.

In some cases, the test site 310 may include a site coordinator 325 to manage the testing of the component application 330 by the test tools 320. For example, the site coordinator 325 may be used to manage computing resources, such as by allocating test scripts to be performed by the one or more test machines 340 (e.g., computing devices 101), when validating the operation of the component application 330. When testing the component application 330, many different situations may be simulated by using one or more sets of test scripts 275. In many cases, processing the set of test scripts 275 using the set of test data 265 may be resource intensive, such that the site controller 325 may allocate computing resources to process the different scripts on different test machines 340. This allocation of testing resources is discussed more fully in U.S. Pat. Nos. 8,301,935 and 8,020,044 both entitled, "Distributed Batch Runner", which are both incorporated herein in their entirety by reference. In some cases, the test coordinator 210 and/or one or more site coordinators 325 may be configured to reuse one or more scripts stored in a repository (e.g., the local repository 350, the central repository 240, and the like) when performing tests of the component applications 230, 330, as described more fully in U.S. Patent Application No. 2013/0041900 entitled, "Script Reuse and Duplicate Detection", which is incorporated herein in its entirety by reference.

As discussed previously, the testing coordinator 210 may be configured to coordinate testing of two or more different component applications 230 associated with the multi-step process 220. In some cases, the first application 232 may be configured to be tested using a first test tool and one or more other component applications 234, 235, 236, 238 may be configured to be tested using one or more different test tools incompatible with the first test tool. In some cases, each component application 330 may be tested at one or more different test sites 310. The testing coordinator 210 may include a processor 212, a memory 214 such as the non-transitory memory device 115 (e.g., RAM, ROM, disk drive, EEPROM, and the like), a communication interface 216 and/or a user interface 218. In some cases, the testing coordinator 210 may be implemented using the computer device 101 of FIG. 1 and/or using other configurations of hardware and/or software. The memory 214 may be configured to store instructions and/or data used by the testing coordinator 210. For example, the memory 214 may hold instructions that, when executed by the processor 212, cause the testing coordinator 210 to identify a test case 251 stored in the central repository 240, initiate, via the network 360, testing of the first component application 232, 330 by the first test tool 320 using the test data set 265 and the first set of scripts 275. The testing coordinator 210 may then initiate, via the network, upon completion of testing of the first component application 232, 330, testing of the second component application 234 by a second test tool 320 using the test data set 265 and the second set of scripts 275. After initiating a test of a final component application 238, the testing coordinator 210 may provide an indication of whether the test of the multi-step process 220 completed successfully using results obtained from the test tools associated with each of the component applications 230, such as the first test tool 320 and the second test tool 320.

The communication interface 216 may be used to facilitate communication by the testing coordinator with one or more devices at the test sites 310. For example, the communication interface 216 may be used to communicate to the central repository 240 and/or one or more devices at the test sites 310 via a wired or wireless communication network 360 (e.g., the internet, a local area network (LAN), a wide area network (WAN), a cellular network, a wireless Ethernet network, and the like). For example, the testing coordinator 210 may be configured to communicate to one or more of the test tools 320, the site coordinator 325, one or more of the test machines 340 and/or the local repository 350 via the network 360.

The user interface 218 may be used to facilitate the testing of the process 220 by the testing coordinator 210. The user interface may include one or more user interface device capable of presenting information to and/or receiving information from a user. For example, a user interface may include one or more of a visual presentation device (e.g., a CRT display, an LED display, an LCD display, a touchscreen display, and the like), an audio presentation device (e.g., a speaker) and/or an input device (e.g., a keyboard, one or more switches, one or more buttons, a microphone, and the like). In some cases, the user interface 218 may be configured to display at least one screen for configuring the testing of the multi-step process 220. For example, the screen may include a configuration screen to select a test case 251, an error reaction (e.g., continue after an error, pause after an error, stop testing on errors, and the like), and/or a run mode (e.g., automatic mode, manual mode, and the like). In some cases, a user may configure how to deliver a test report upon completion of the process test, such as by selecting an email option, a text message option, an instant message option, a printed report option, and/or a user interface screen option. In some cases, one or more security options may be selectable. For example, the user interface may prompt for a user name and password to allow a user to begin testing, enter configuration information, and/or view a test report. In some cases, a user may not enter any information. In such cases, configurations may be stored in and/or uploaded from a flat file, such as a text file, an XML file and the like.

Figure 4:
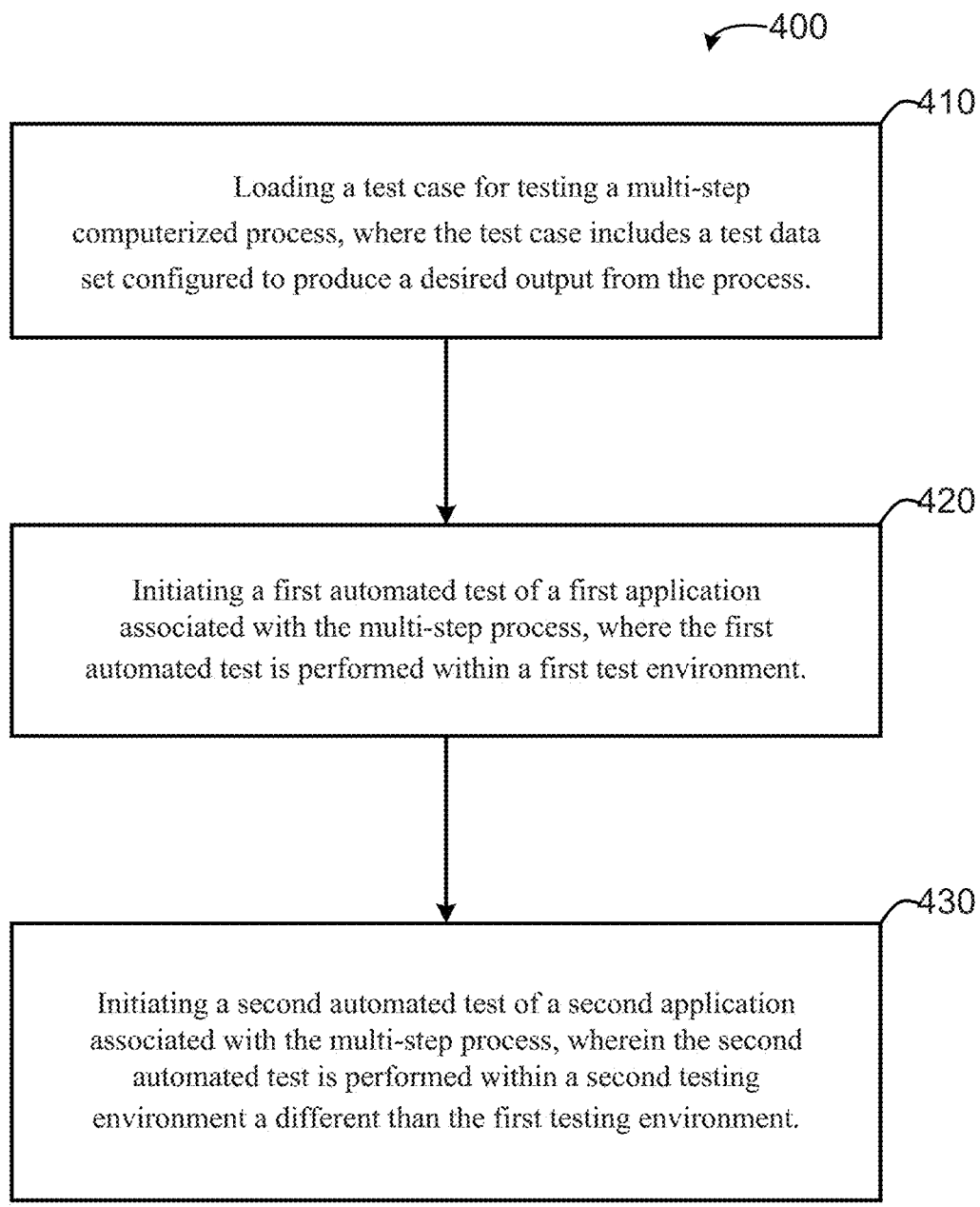
FIG. 4 is a flowchart of an illustrative method for coordinating the automated tests of two or more applications used to perform the multi-step process of FIG. 2 according to one or more aspects of the present disclosure.

FIG. 4 is a flowchart of an illustrative method 400 for coordinating the automated tests of two or more applications 230 used to perform the multi-step process 220 of FIG. 2 according to one or more aspects of the present disclosure. For example, at 410, the testing coordinator 410 may load a test case 250 for testing a multi-step computerized process 230, where the test case 250 includes at least one test data set 265 configured to produce a desired output from the process 230. At 420, the testing coordinator 210 may initiate a first automated test of a first application 232 associated with the multi-step process 220, where the first automated test is performed within a first test environment at a test site 310. The test environment may include one or more test tools 320, a site coordinator, one or more test machines 340, and/or a local repository 350. At 430, the testing coordinator 210 may initiate a second automated test of a second application 234 associated with the multi-step process 220, wherein the second automated test is performed within a second testing environment a different than the first testing environment. In some cases, the second testing environment is located at a different geographical location from the first testing environment. In some cases, the testing coordinator initiates testing of a third application using a third testing environment different than the first testing environment and/or the second testing environment. In some cases, each of the first testing environment, the second testing environment, and/or the third testing environment includes one or more test tools, wherein the test tool used by the first test environment is incompatible with the test tool used by the second testing environment and/or the test tool used by the third testing environment.

In some cases, each test tool may be associated with particular testing framework architecture. In some cases, the testing framework may change (e.g., an update, a scripting language change, and the like) such that a script developed for use with an early version of the test tool may be incompatible with a later version of the testing framework architecture. For example, even though the testing tool is the same, changes required to update the framework architecture may cost more than using the testing coordinator 210 to initiate processes using the different framework architec-tures to test the process 220. This may occur when using legacy and/or old test cases where a large test bed (e.g., over 4000 test cases) for the first component 232 are not in a framework format compatible with the testing framework associated with the second component application 234, even though the testing tools are the same. Modifications may include data format, scripts (e.g., script languages, scripting styles, and the like) and/or objects associated with the way data is processed. Implementing these modifications may take significant effort, which defeats the purpose of automated testing, as there will more effort involved in merging the framework/architecture than the cost reduction that would be realized by implementing the change. In such cases, the testing coordinator 210 may initiate testing of a first component application 232 within the first testing environment and initiate testing of the second component application 234 with the second testing environment], incompatible with the first testing environment.

In some cases, the testing coordinator 210 may initiate testing of the first component application 232 within a first testing environment and initiate testing of one or more different component applications 230 within a testing environment that is the same as, or similar to, the first testing environment. For example, two or more different component applications may be developed at the same geographical location and tested within the same testing environment. In an example, two or more different component applications 230 may be developed and/or tested at different geographical locations. The different component applications may be tested within the same testing environment, within a testing environment similar to the first testing environment, and/or within different testing environments. In an illustrative example, the first component application 232 may be tested within a first testing environment at a first geographical location, the second component application 234 may be tested within a second testing environment at a second geographical location, the third component application 236 may be tested within a third testing environment similar to the first testing environment at a third geographical location, and the fourth component application 238 may be tested within the first testing environment at the first geographical location.

The testing coordinator 210 may allow for the same application to be tested with different testing frameworks using the same testing tool within the same testing environment. By doing so, the testing coordinator 210, may allow data to be passed between test cases. For example, a multi-step process 220 may be tested using the same test tool, but the component applications 230 may be developed using different frameworks and/or different versions of the same testing framework. Previously, to ensure the multi-step process 220 could be tested, costly (e.g., time, money, and the like) updates may be necessary to ensure every framework is compatible. By using the testing coordinator 210, such updates may be unnecessary because the testing coordinator 210 may be used to coordinate testing of the multi-step process 220 by initiating testing of each of the component applications 230 within their associated testing framework and passing data (e.g., stored data 260, dynamically generated data, and the like) between the one or more test cases 250 used to perform the test of the multi-step process 220.

For example, the first component application 232 (e.g., a payment application) may generate a payment reference number whenever a payment is initiated. This reference number may then be used by the second component application 234 (e.g., a reporting application) to search for the payment and confirm whether it is initiated. The payment application may be tested within in the same environment as the reporting application when testing an associated payment process using the same test tool, however the testing framework of the payment application may be different (e.g., a different version) than the testing framework of the reporting application. In some cases, the component application may be the same. For example, an older version, or portions of an older version, of a component application may be used when developing a newer version of the same component application. In some cases, portions of a component application may be merged to provide similar functionality in a different component application. For example, portions of the first component application 232 (e.g., a local payment application) may be merged into a different component application (e.g., a global payment application) and/or a newer version of the first component application. In such cases, at least portions of the component application code, the test cases 250, the test data 260 and/or the test scripts 270 associated with the local payment application may be merged with the corresponding component application code, test cases, test data and test scripts associated with the global payment application and/or associated with a newer version of the local payment application. By doing so, portions of the first component application 232 may be merged with the corresponding portions of the second component application 234 and/or a newer version of the first component application 232. Similarly, test cases 250, test data 260 and/or test scripts 270 associated with the first component application 232 may be merged, or otherwise combined, with the test cases 250, test data 260 and/or test scripts 270 developed for use with the second component application 234 and/or the newer version of the first component application. As such, the testing coordinator 210 may be used to save time and/money when testing the component applications 230 associated with one or more multi-step processes.

Figure 5:
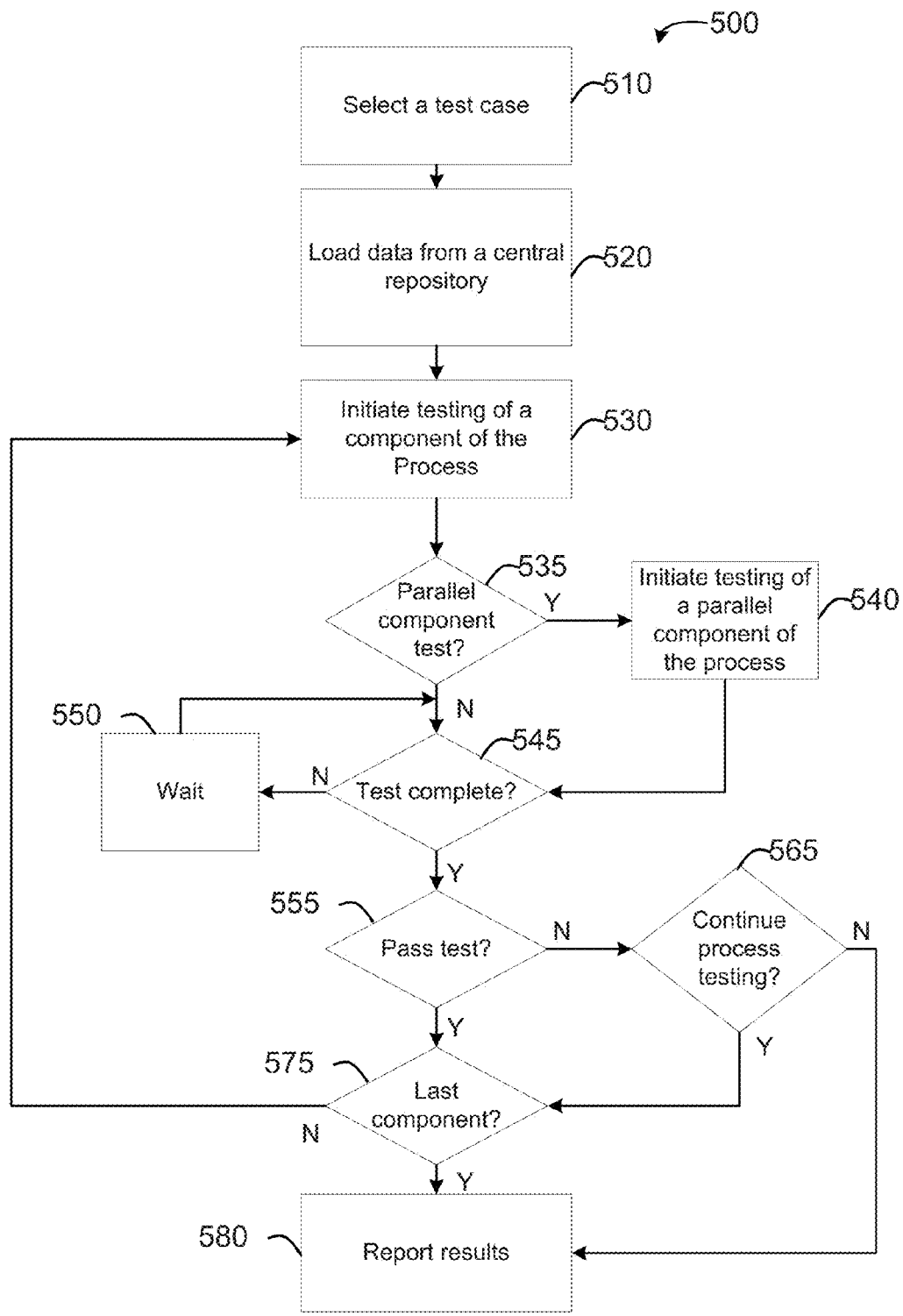
FIG. 5 is another flowchart of an illustrative method for coordinating the automated tests of two or more applications used to perform the multi-step process of FIG. 2 according to one or more aspects of the present disclosure.

FIG. 5 is another flowchart of an illustrative method 500 for coordinating the automated tests of two or more applications 230 used to perform the multi-step process 220 of FIG. 2 according to one or more aspects of the present disclosure. At 510, a test case may be selected by a user or automatically by the testing coordinator. At 520, the testing coordinator 210 may load data (e.g., a test data set 265, a result data set, and the like) from a central repository 240 and/or a local repository 350 for use in testing the multi-step process 220.

At 530, the testing coordinator 210 may initiate testing of the multi-step process 220, such as by initiating a test of one or more component applications 230 associated with the multi-step process. For example, the testing coordinator may initiate a test of the first component application 232 by the site coordinator 325 at a first test site 310. At 535, the testing coordinator 210 may decide whether any of the other component applications 230 may be tested in parallel with the component application currently under test. If so, at 540, the testing coordinator initiates testing of a different component application (e.g., the component application 235) in parallel with the component application currently under test.

If not, at 545, the testing coordinator 210 determines whether the test of the one or more component applications 230 are complete. If not, the testing coordinator 210 waits (e.g., for a duration, for an input, and the like) until the testing coordinator 210 receives an indication that the component application test(s) are complete. If test(s) have completed, then the testing coordinator 210 may determine whether the one or more component applications 230 have passed the test. In some cases, the site coordinator 325 may provide information (e.g., a report) about the success or failure of the component application test. Sometimes, the testing coordinator 210 may compare results output by the component application, such as an updated test data set, to a result data set that may be stored in the central repository 240. In some cases, the result data set includes a particular desired output of the component application based on the test data set used during the component application test.

At 575, if a test was passed, the testing coordinator 210 may determine whether the last component application (e.g., component application 238) associated with the process 220 has been tested. If not, the testing coordinator may initiate testing of the next component application at 530. If so, the testing coordinator may report the results of the test of the multi-step process 220 to a user, such as via an email, a printed report, a text message, a computer file, a screen on a user interface, or the like.

Returning to 555, if the testing coordinator 210 determines that a component application did not pass the test, then the testing coordinator determines whether to continue testing of the multi-step process. For example, a user may define an error reaction applied during the test of the multi-step process 220. For example, the user may desire that testing may be ended when an error occurs. In some cases, the user may desire that testing may be paused, such as to wait for a user input, when an error occurs. In other cases, the user may desire that testing continues regardless of whether an error occurs. In some cases, the testing coordinator 210 may be configured to apply a different error reaction when testing each of the different component applications 230. If the, user decides to end the testing when after an error or the component application otherwise did not pass the test, the testing coordinator may report the results of the test of the multi-step process 220 to the user at 580. Otherwise, the testing coordinator 210 may determine whether the last component application associated with the multi-step process 220 has been tested at 575.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. An apparatus to coordinate testing of two or more different applications associated with a multi-step process, wherein a first application is configured to be tested using a first test tool and the second application is configured to be tested using a second test tool incompatible with the first test tool, the apparatus comprising:

a communication interface to facilitate communication by the apparatus to the first test tool, the second test tool and a central repository via a network, the central repository storing at least one test case including a test data set, a first set of scripts for use with the first test tool and a second set of scripts for use with the second test tool;

a processor coupled to the communication interface; and a non-transitory memory coupled to the processor, the memory storing instructions that, when executed, cause the processor to:

identify a test case stored in the central repository;

determine an efficient use of available testing resources based on the operation of at least the first test tool and the second test tool, any dependencies between the two or more applications, and an amount of resources available to process the first set of scripts and the second set of scripts;

initiate, via the network, testing of the first application by the first test tool using the test data set and the first set of scripts, wherein at least two of the first application, the test tool, and the apparatus update at least a portion of the test data set before the testing coordinator initiates testing of the second application using the updated test data set;

initiate, via the network upon completion of testing of the first application, testing of the second application using the test data set and the second set of scripts; wherein the first application updates the test data set with data output from the first application and wherein a selection of the second set of scripts is based on the data output from the first application; and provide an indication of whether the test of the multi-step process completed successfully using results obtained from first test tool and the second test tool.

2. The apparatus of claim 1, further comprising a user interface, wherein the user interface includes at least one screen configured to provide information about the test of the multi-step process, including the indication of whether the test of the multi-step process completed successfully.

3. The apparatus of claim 2, wherein the user interface is configured to display a screen for facilitating a selection of a test case from the one or more test cases stored in the central repository.

4. The apparatus of claim 1, wherein the test case included in the central repository includes a result set, wherein the instructions, when executed, would further cause the processor to compare information received from the first test tool about the test of the first application and/or information received from the second test tool about the test of the second application to the result data set to determine the indication of whether the test of the multi-step process completed successfully.

5. The apparatus of claim 1, wherein the instructions, when executed, would further cause the processor to initiate testing of a third application using the test data set and a third set of scripts associated with a third test tool, wherein the apparatus initiates the testing of the third application in parallel with the testing of the first application and/or the testing of the second application.

6. The apparatus of claim 1, wherein the multi-step process is associated with a process for transferring information from a computer device at a first geographical location to a computer device at a second geographical location.

7. The apparatus of claim 6, wherein the multi-step process is associated with performing a financial transaction.

8. The apparatus of claim 1, wherein the first test tool is located at a first geographical location and the second test tool is located at a second geographical location different than the first geographical location.

* * * * *